United States Patent

Momiyama et al.

[11] Patent Number: 4,717,819
[45] Date of Patent: Jan. 5, 1988

[54] FOCUS DETECTING DEVICE

[75] Inventors: Kikuo Momiyama; Kazuo Fujibayashi, both of Kanagawa; Keiji Ohtaka, Tokyo, all of Japan

[73] Assignee: Canon Kabushiki Kaisha

[21] Appl. No.: 677,207

[22] Filed: Dec. 3, 1984

[30] Foreign Application Priority Data

Dec. 12, 1983 [JP] Japan ................. 58-233812

[51] Int. Cl.⁴ .................. G01J 1/36; G01C 3/08
[52] U.S. Cl. .......................... 250/204; 356/4
[58] Field of Search .......... 250/201, 204; 356/4; 354/408

[56] References Cited
U.S. PATENT DOCUMENTS 4,563,576 1/1986 Matsumura et al. ......... 250/204

FOREIGN PATENT DOCUMENTS 57-73709 5/1982 Japan .

Primary Examiner—Gene Wan
Attorney, Agent, or Firm—Toren, McGeady & Associates

[57] ABSTRACT

A focus detecting device arranged to detect the focusing condition of an objective lens by projecting a light flux from a light source onto an object through the objective lens and by sensing the light flux after it is reflected from the object. The focus detecting device is provided with sensors which produce information necessary for detecting the focal point of the objective lens by sensing the light of the light source reflected by the object. Degradation of the device's detection accuracy due to the eccentrically mounted objective lens is prevented when these sensors are symmetrically arranged relative to a plane containing the optical axis of the objective lens.

12 Claims, 13 Drawing Figures

FOCUS DETECTING DEVICE

BACKGROUND OF THE INVENTION

1. Field of the Invention

This invention relates to a focus detecting device which detects the focusing condition of an objective lens by projecting a light flux from a light source onto an object through the objective lens and by sensing the light flux after it is reflected from the object and more particularly to a focus detecting device adapted for an optical apparatus, such as a camera, a video camera or the like.

2. Description of the Prior Art

Focus detecting devices of the kind detecting the focusing condition of an objective lens by projecting a light flux from a light source onto an object through the objective lens and by sensing with a sensor the light flux after it is reflected from the object have been known and proposed, for example, in Japanese Laid-Open Patent No. SHO 57-73709 (laid open date: May 8, 1982).

The device disclosed in the above cited patent application is capable of detecting the focusing condition in a fairly satisfactory manner, even for a dark or low-contrast object. The device has the advantage of the so-called active type focus detecting device which permits a relatively simple arrangement of the sensor and the signal processing circuit. In addition, the device is not degraded by reflection from the lens surface of a photo-taking lens.

However, when used for a camera which has an interchangeable lens, such as a single-lens reflex camera, this device of the prior art presents the following problem: If eccentricity or mis-alignment occurs between a camera body and a photo-taking lens in mounting the latter on the former due to an assembly error either on the side of the camera body or on the side of the lens, focus detecting accuracy is greatly decreased.

An object of the present invention is therefore to provide a focus detecting device in which the detecting accuracy is never degraded even when the device is applied to a camera of the kind using an interchangeable lens.

Another object of the invention is to provide an active type focus detecting device which is capable of performing focus detection with great accuracy.

These and further objects and features of the invention will become apparent from the following detailed description of preferred embodiments thereof taken in conjunction with the accompanying drawings.

SUMMARY OF THE INVENTION

A device for detecting the focusing state of an objective lens including light projecting means for projecting a light flux on an object through the objective lens, and a plurality of sensing means for sensing the light flux projected from the light projecting means after the light flux is reflected by the object. Each of the sensing means produces a signal required for the detection of the focusing state of the objective lens and is arranged symmetrically relative to a plane containing the optical axis of the objective lens.

DETAILED DESCRIPTION OF THE PREFERRED EMBODIMENTS

Figure 1:
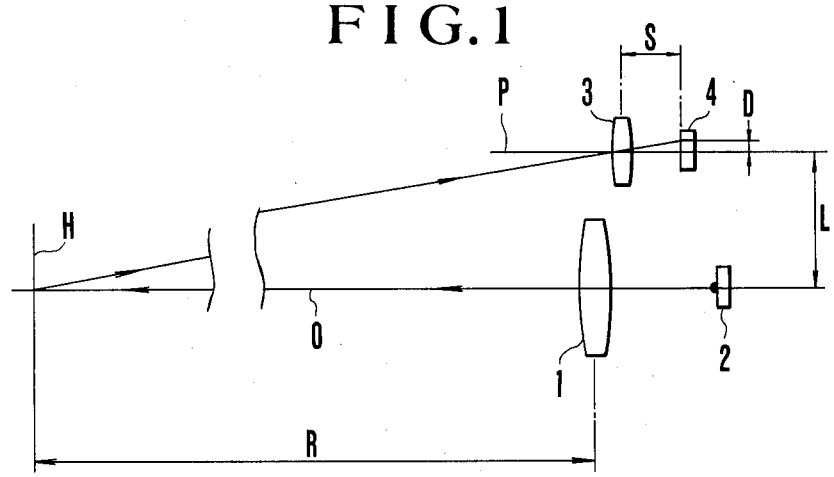
FIG. 1 schematically shows, by way of example, an active type focus detecting device.

Referring to FIG. 1 which shows an example of the optical system employed in an active type focus detecting device, the illustration includes a photo-taking lens 1; a light source 2 which is composed of a light emitting diode or the like; a light receiving lens 3; and a sensor 4 which is composed of an SPD or the like. The light receiving lens 3 and the sensor 4 jointly form light receiving means. The light source 2 is disposed on an optical axis 0 of the photo-taking lens 1. A light flux emitted from the light source 2 is projected through the photo-taking lens 1 onto a surface H of an object. The light flux does not have to go through the whole photo-taking lens 1, but may be allowed to go through a part of the lens 1. Then, the projection light flux is projected with the optical axis 0 of the photo-taking lens 1 at the center of the flux regardless of the focal point of the photo-taking lens 1 and the object distance. Then, a reflection light flux from the object passes through the light receiving lens 3 to be imaged on the sensor 4. A sensor D of the received light flux imaged on the sensor 4 is expressed by the following formula obtained, according to the principle of trigonometry, from an object distance R, a base length L which is expressed by a distance between the optical axis 0 of the projected light flux and an optical axis P of the received light flux and a distance S between the light receiving lens 3 and the sensor 4:

$$D = \frac{L}{R} \times S \qquad (1)$$

Figure 2:
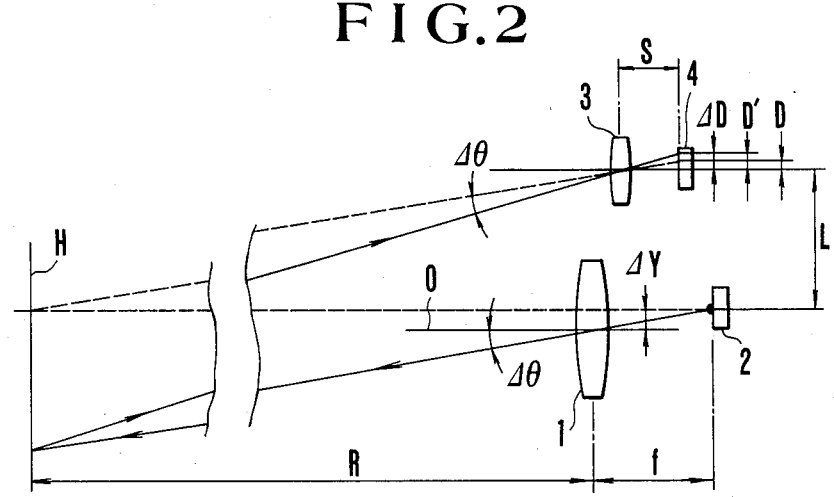
FIG. 2 schematically shows the device shown in FIG. 1 eccentrically mounted on a photo-taking lens.

The image forming position D of the received light flux on the sensor 4 is determined by the object distance R and, conversely, the object distance R is obtainable from the imaging position D of the received light flux on the sensor 4. Then, focus adjustment becomes possible by controlling the focal point of the photo-taking lens 1 based on the object distance R thus obtained. Next, a situation in which the photo-taking lens 1 is eccentric relative to the optical axis 0 is shown. FIG. 2 shows a situation where eccentricity Y happens in the photo-taking lens 1 of the optical system of FIG. 1. Assuming that the focal length of the photo-taking lens 1 is f, the position D at which an image of the received light flux is formed on the sensor 4 deviates to another position D' thus bringing about an error $\Delta D$ which is apparent from FIG. 2. The degree of this error $\Delta D$ can be expressed as shown below from an error $\theta$ (radian) in the angle of light projection $= \Delta Y/f$:

$$D = \frac{\Delta Y}{f} \times S \qquad (2)$$

Then, an error $\Delta x$ in focus adjustment resulting from the above-stated error is as follows: The relation between the degree of light flux displacement $\Delta D$ and an object distance error $\Delta R$ can be expressed as follows by differentiating the two sides of Formula (1) above:

$$\Delta D = \frac{L}{R^2} \times S \times \Delta R \qquad (3)$$

Furthermore, from the image forming formula, the relation between the object distance error $\Delta R$ and the focus adjustment error $\Delta x$, can be expressed as follows:

$$\Delta x = \frac{f^2}{R^2} \times \Delta R \qquad (4)$$

From Formulas (2), (3) and (4), the relation between the eccentricity $\Delta Y$ of the photo-taking lens 1 and the focus adjustment error $\Delta x$ can be expressed as follows:

$$\Delta x = \frac{f}{L} \times \Delta Y \qquad (5)$$

As is obvious from Formula (5) above, if the focal length f of the photo-taking lens 1 is long and the base length L cannot be lengthened, a large focus adjustment or focusing error $\Delta x$ results from a slight eccentricity of the photo-taking lens 1. For example, if the focal length "f" of the photo-taking lens 1 is 100 mm, the brightness of the lens 1 is F 2.8 and the base length L is 30 mm, in order to make the blur degree due to the focusing error $\Delta x$ less than an allowable diameter of the circle of confusion $\phi$ 0.035 mm, the allowable degree of eccentricity $\Delta Y$ of the photo-taking lens 1 becomes, from Formula (5), $\Delta Y < 30/100 \times (2.8 \times 0.035)$ and thus the eccentricity must be less than 0.03 mm. However, such a value is hardly obtainable in actuality because of eccentricity due to a mounting play, etc. particularly with a camera of the type using the interchangeable photo-taking lens 1.

Figure 3:
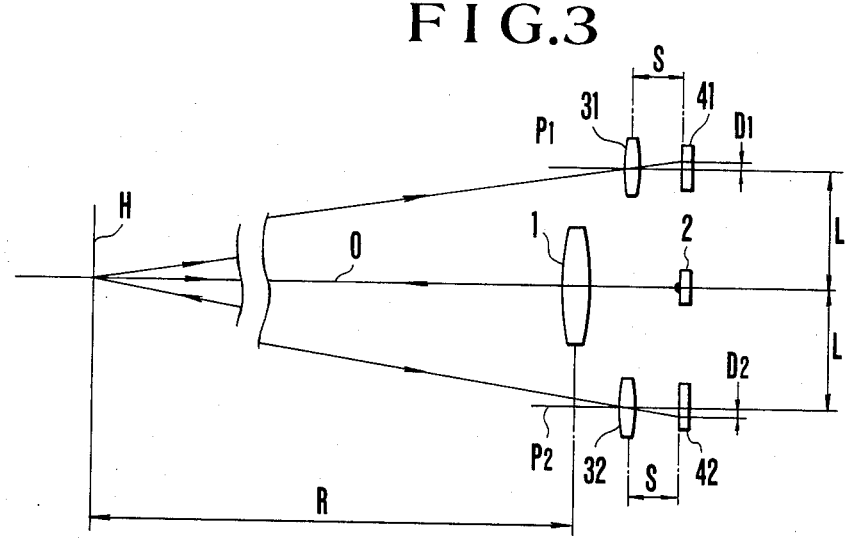
FIG. 3 schematically shows a focus detecting device arranged according to the present invention in an embodiment thereof.
Figure 4:
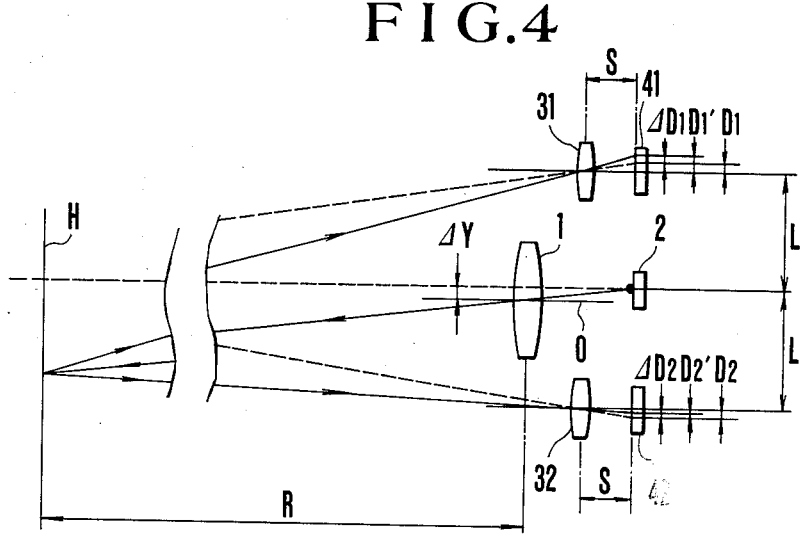
FIG. 4 schematically shows the same embodiment of the invention with an eccentrically mounted photo-taking lens.

FIG. 3 shows the optical system in an embodiment of this invention. The illustration includes the photo-taking lens 1; the light source 2 which is a light emitting diode or the like; light receiving lenses 31 and 32; and sensors 41 and 42. In this embodiment, the object distance R is determined on the basis of an average value of positions at which the images of a received light flux are formed on the sensors 41 and 42. In this case, two light receiving means which function in the same manner are arranged symmetrically relative to the optical axis of the photo-taking lens 1. Therefore, the imaged positions of the received light flux on the sensors 41 and 42 are arranged to be of the same value for the same object distance R. In the event that the photo-taking lens 1 of FIG. 3 has some eccentricity $\Delta Y$ relative to the optical axis 0 thereof as shown in FIG. 4, the image positions D1 and D2 of the received light flux on the sensors 41 and 42 are respectively shifted to positions D1' and D2' thus resulting in errors $\Delta D1$ and $\Delta D2$. From Formula (2), these errors $\Delta D1$ and $\Delta D2$ can be expressed as shown below:

$$\Delta D1 = \frac{\Delta Y}{f} \times S; \Delta D2 = \frac{-\Delta Y}{f} \times S$$

In other words, these image positions deviate equal extents in opposite directions. Therefore, in accordance with the arrangement of this embodiment, even if the photo-taking lens 1 has eccentricity, the average value of the image positions D1' and D2' of the received light flux is equivalent to the average value of the image positions of the light flux received when the photo-taking lens 1 is not eccentric, so that the object distance R can be correctly determined for an accurate focusing operation on the photo-taking lens 1.

Figure 5:
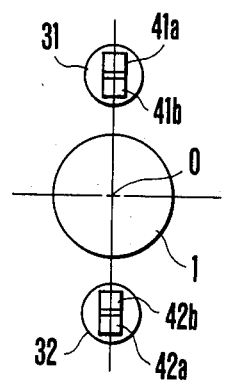
FIG. 5 shows the arrangement of sensors used in the same embodiment.

The sensors 41 and 42 of the embodiment shown in FIGS. 3 and 4 are arranged as shown in FIG. 5. Referring to FIG. 5, each of these sensors 41 and 42 is formed by two photo-electric conversion elements 41a and 41b or 42a and 42b such as SPD's or the like which are adjacently aligned side by side in a direction perpendicular to the optical axis of the photo-taking lens 1, i.e. in the direction of a base line. To image the received light flux at a mid-point between each pair of these photo-electric conversion elements 41a, 41b, 42a, 42b, either the light receiving lenses 31, 32 or the sensors 41 and 42 are shifted symmetrically in a direction perpendicular to the optical axis p based on the position of the object to be photographed. Then, the focal point of the photo-taking lens 1 is adjusted based on their shifting extents.

Figure 6A:
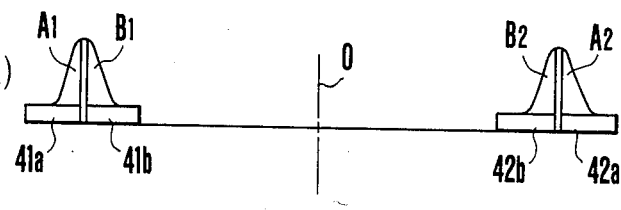
FIGS. 6(a), 6(b) and 6(c) show the light receiving state of each of the sensors used in the same embodiment.
Figure 6B:
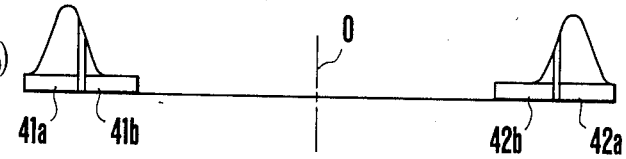
Figure 6C:
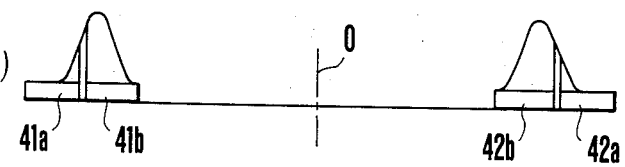

FIGS. 6(a), 6(b) and 6(c) show the different states of the received light flux imaged on the photo-electric conversion elements 41a, 41b, 42a and 42b. FIG. 6(a) shows the received light flux in an in-focus state. Quantities of received light A1 and B1 on the elements 41a and 41b are equal to each other while those of light received A2 and B2 on the other pair of elements 42a, 42b are also equal to each other. FIG. 6(b) shows the received light flux in a far-focus state and FIG. 6(c) shows it in a near-focus state.

In this specific embodiment, the center positions of the received light flux on the sensors 41 and 42 are detected with the difference between the outputs of those of the elements 41a and 41b (A1−B1) of the sensor 41 and the difference between those of the elements 42a and 42b (A2−B2) of the sensor 42 added together and when an output C, which is thus obtained and can be expressed as C=(A1−B1)+(A2−B2), becomes zero.

Figure 7:
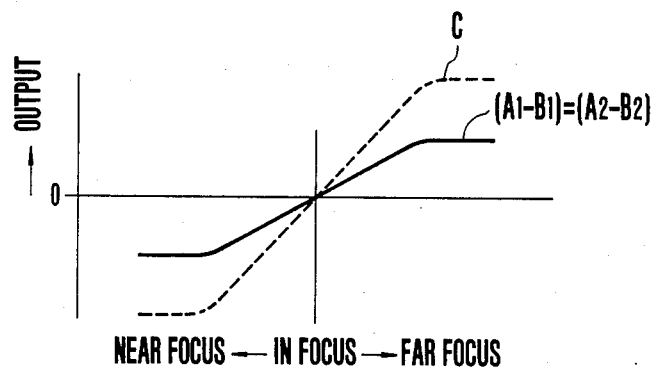
FIG. 7 is a graph showing the output of the sensors in the embodiment.
Figure 8:
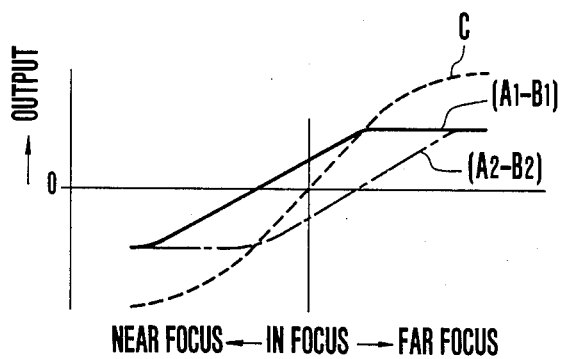
FIG. 8 is a graph showing the output of the sensors obtained with the photo-taking lens eccentrically mounted.

FIG. 7 shows the output of the device obtained in each of different focus conditions. In FIG. 7, a full line denotes the output (A1−B1) and another output (A2−B2). A broken line denotes the output C. In the event that the photo-taking lens 1 has some eccentricity as mentioned in the foregoing with reference to FIG. 4, these outputs (A1−B1) and (A2−B2) do not become zero at the in-focus position. However, in spite of that, the output C which is obtained by adding these outputs together becomes zero at the in-focus position, as is obvious from the foregoing description. Therefore, the embodiment is capable of performing accurate focus adjustment without being affected by the eccentricity of the photo-taking lens 1.

Figure 9:
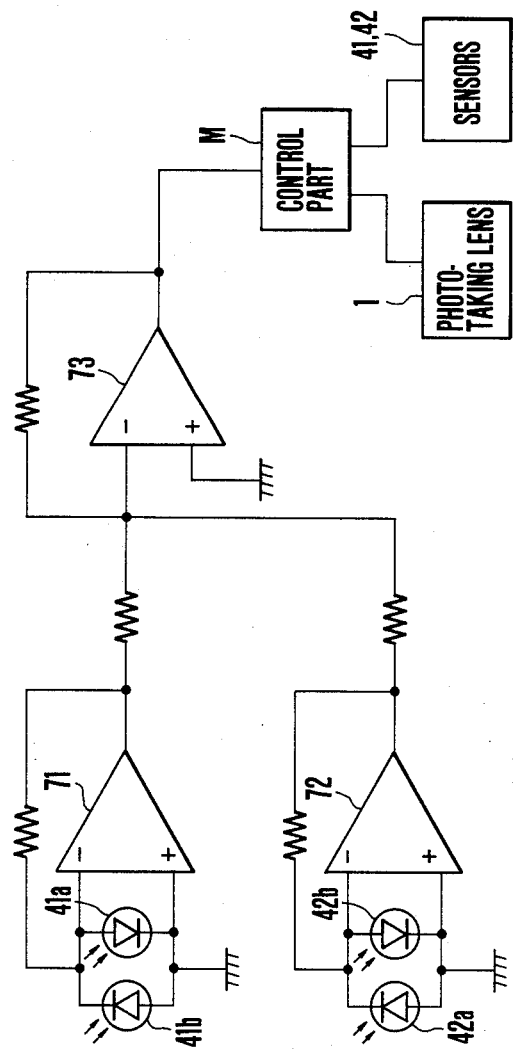
FIG. 9 is a diagram showing a signal processing circuit in the embodiment.

For the operation of the embodiment described, the technical arrangement of the prior art is applicable to the electric circuit and to the mechanical structural arrangement of the embodiment. However, an example of signal processing circuits applicable to the embodiment will be given below with reference to FIG. 9:

Referring to FIG. 9, the photo-electric conversion elements 41a and 41b form the sensor 41 and the photo-electric conversion elements 42a and 42b form the other sensor 42. The circuit includes operational amplifiers 71, 72 and 73; and a control part M. The difference between the outputs of the elements 41a and 41b is obtained by the operational amplifier 71 and the difference between the outputs of the elements 42a and 42b by the operational amplifier 72. The outputs of these operational amplifiers 71 and 72 are added together by the operational amplifier 73. Then, the control part M controls the photo-taking lens 1 and the sensors 41 and 42, making the output of the operational amplifier 73 zero for detection of an in-focus state.

As mentioned above, an in-focus state is detected by detecting a position where the difference between the outputs of the two photo-electric conversion elements 41a, 41b, 42a, 42b becomes zero. However, this method of the embodiment may be replaced with different methods. For example, a method in which the position of a center of gravity of the received light flux is detected by means of a line sensor, such as a CCD or the like, and the focal point of the photo-taking lens 1 is controlled on the basis of the detected position is also applicable to this invention.

Figure 10:
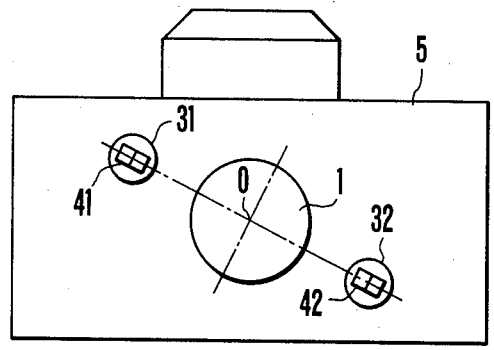
FIG. 10 shows a specific sensor arrangement in the same embodiment.

FIG. 10 shows an example of actual allocation of this embodiment on a camera. As shown, the light receiving lenses 31 and 32 and the sensors 41 and 42 are allocated on the front side of the camera symmetrically arranged relative to the optical axis 0 of the photo-taking lens 1. The light source 2 is disposed within the camera body on the optical axis 0 of the photo-taking lens 1. In this specific example, the two light receiving lenses 31 and 32 are obliquely aligned on the camera. However, they may be arranged in any different manner that is best suited for the camera.

Figure 11:
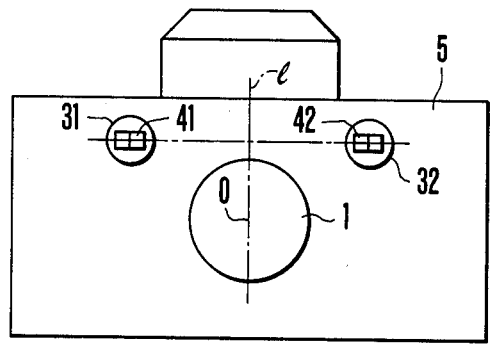
FIG. 11 shows the sensor arrangement in another embodiment.

FIG. 11 shows another example of allocation. In this case, the light receiving lenses 31 and 32 and the sensors 41 and 42 are allocated not symmetrically relative to the optical axis of the photo-taking lens 1 but are allocated symmetrically relative to a plane l containing the optical axis. The sensors 41 and 42 are moreover have their photo-electric conversion elements aligned in a direction-perpendicular to the plane l. In the case of this example, the deviation of the received light flux imaged on the sensors 41 and 42 is detected by detecting the components thereof existing in the direction perpendicular to the plane. With the exception of this, the adverse effect of the eccentricity of the photo-taking lens can be prevented in the same manner as in the case of the example given in the foregoing. An advantage of this example of arrangement lies in that the allocation of the light receiving means can be determined with increased latitude.

In accordance with this invention, the arrangement described in the foregoing permits in-focus state detection even in the event of a dark or low-contrast object. The arrangement of the light-receiving or -sensitive elements and the signal processing circuit is relatively simple. The device according to the invention is free from parallax and capable of preventing the in-focus state detecting accuracy from degrading due to the lens surface reflection of the photo-taking lens. The device according to the invention is thus capable of preventing degradation of focusing accuracy due to eccentricity of the photo-taking lens without impairing the advantages of the active type focus detecting devices. With this invention applied to cameras using interchangeable lenses which tend to have some eccentricity, focus detection can be accurately carried out.

What is claimed is:

1. An optical device having an objective lens, comprising:
   light projecting means for projecting detection light on an object through the objective lens; and
   a plurality of light receiving means, for receiving light reflected by the object without passing through the objective lens, arranged substantially symmetrically relative to a plane including a predetermined optical axis of the objective lens, to generate a signal relative to the distance of the object.

2. An optical device according to claim 1, wherein said light receiving means has a lens and a sensor.

3. An optical device according to claim 2, wherein said sensor includes a plurality of photoelectric conversion elements.

4. An optical device according to claim 3, wherein said sensor produces a signal relative to difference of the signals of said plurality photoelectric conversion elements.

5. An optical device according to claim 1, further comprising operation means for compensation of detection error due to displacement of an actual optical axis from the predetermined optical axis on the basis of the outputs of the plurality of light receiving elements.

6. An optical device according to claim 5, wherein said plurality of light receiving elements are respectively, a sensor composed of two photoelectric conversion elements and generates a signal of difference in the signals of plural photoelectric conversion elements, said operation means performing addition of the outputs of the sensors.

7. An optical device according to claim 1, wherein said light receiving elements are arranged symmetrically about the predetermined optical axis of the objective lens.

8. A camera body attachable with an objective lens, comprising:
   light projecting means for projecting detection light on an object through the objective lens;
   a plurality of light receiving optical means, for receiving the detection light reflected by the object, arranged on a surface of a camera body;
   a photosensor for sensing the detection light passing through the light receiving optical means; and
   operation means for operating an adjustment amount for the objective lens for focusing on the basis of the output of the photosensor, said light receiving optical means being arranged substantially symmetrically on a plane including a predetermined optical axis of the objective lens.

9. A camera body according to claim 8, wherein said plurality of light receiving optical means are arranged symmetrically about the predetermined optical axis.

10. A camera body according to claim 8, wherein said photosensor has two light receiving elements.

11. A camera body according to claim 8, wherein said operation means compensates detection error due to displacement of an actual optical axis of the objective lens from the predetermined optical axis on the basis of the output of the photosensors.

12. An optical device attachable with an objective lens, comprising:

light projection means for projecting detection light on an object through the objective lens;

a plurality of light receiving means for receiving the light reflected by the object without passing through the objective lens;

said plurality of light receiving means being arranged substantially symmetrically relative to a plane including a predetermined optical axis of the objective lens; and operation means for compensating detection error due to displacement of an actual optical axis of the objective lens from the predetermined optical axis on the basis of an output from the plurality of light receiving means, and for operating an adjustment amount of the objective lens for focusing.

* * * * *